Feb. 3, 1959     H. P. SMITH     2,871,960
LOCK FOR TWO-WAY PLOW
Filed May 20, 1955     2 Sheets-Sheet 1
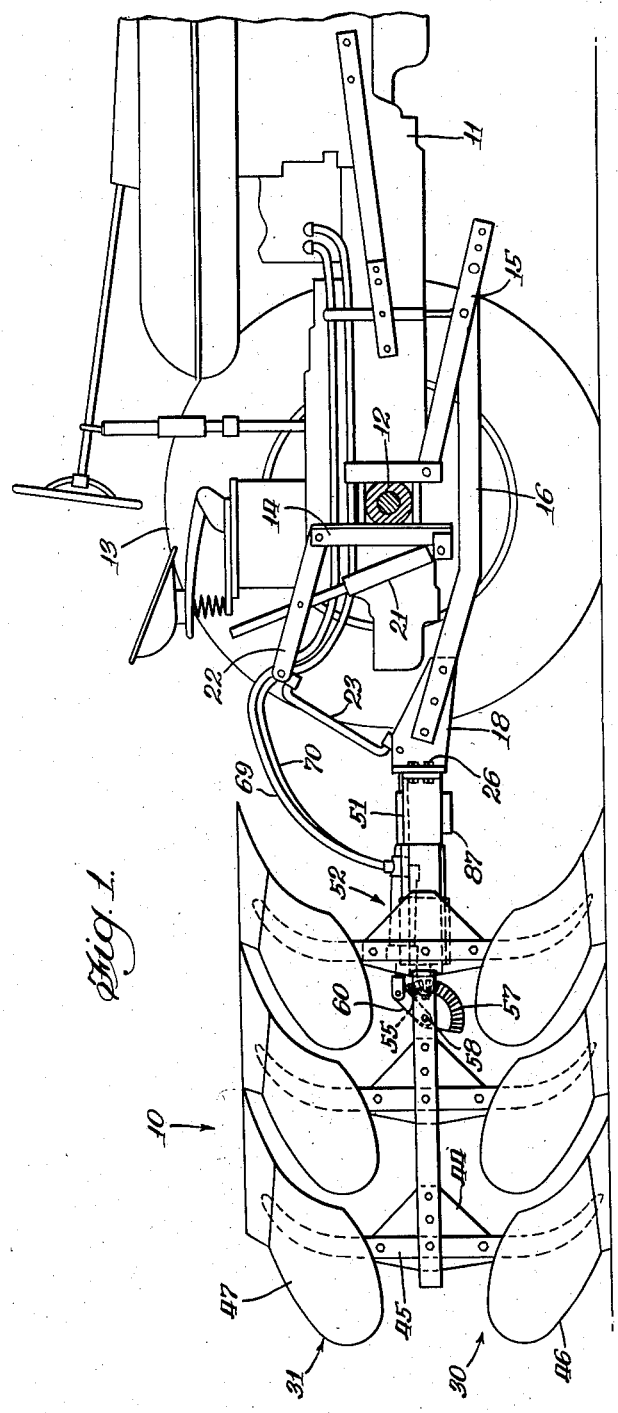
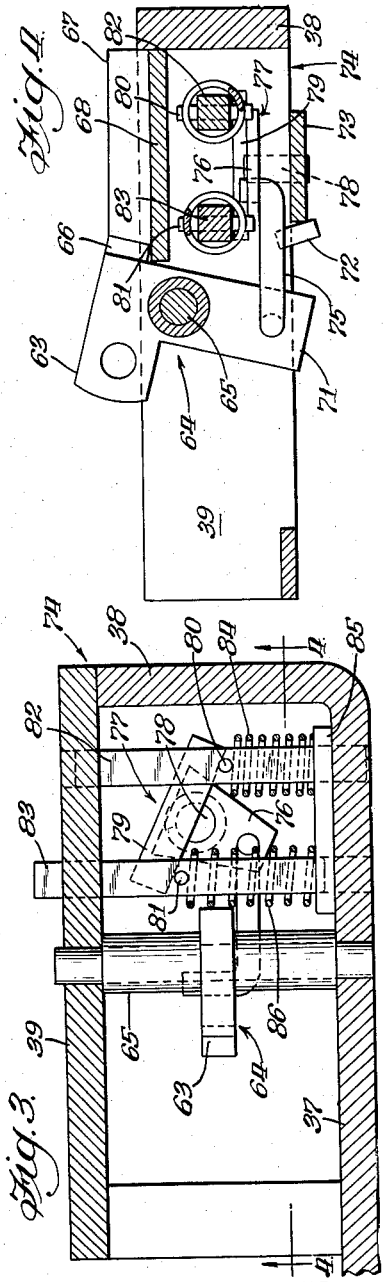
INVENTOR.
Hiram P. Smith
BY Paul O. Pippel
Atty.

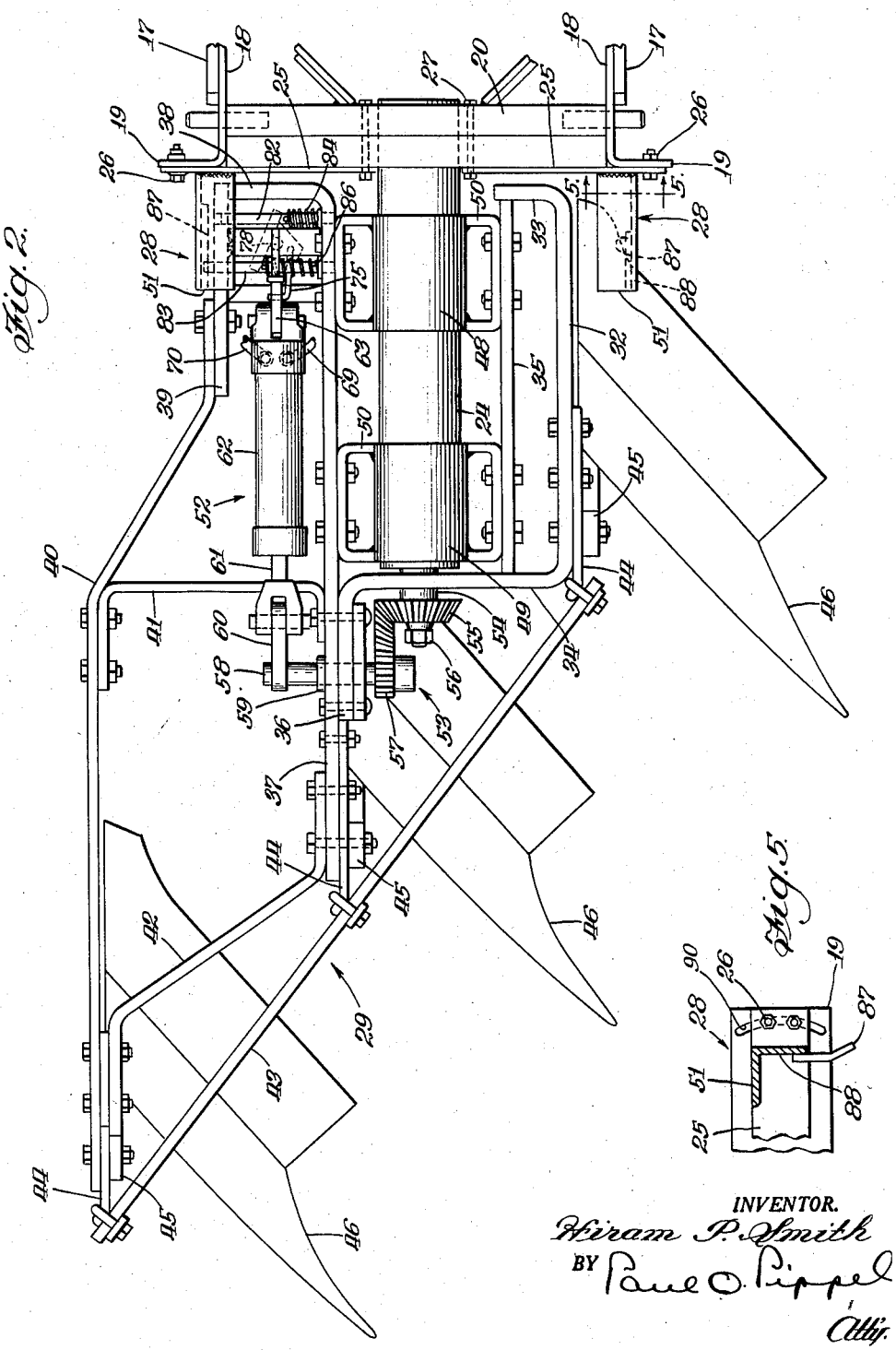

United States Patent Office 2,871,960
Patented Feb. 3, 1959

2,871,960
LOCK FOR TWO-WAY PLOW

Hiram P. Smith, Stockton, Calif., assignor to International Harvester Company, a corporation of New Jersey Application May 20, 1955, Serial No. 509,733

3 Claims. (Cl. 172—226)

This invention relates to agricultural implements and particularly to operating mechanism therefor. More specifically the invention concerns a two-way plow having alternately operating right and left hand plowing units and novel latch means for locking the implement in position with one of the plow units in operation.

An object of the invention is the provision, in an implement having two movable parts, of common power means on the implement for moving both of those parts.

Another object of the invention is the provision, in a two-way plow having latch means for locking the plow alternately in two positions, of a hydraulic ram attachment for moving the plow units from one position to another and for also releasing the latch to accommodate said movement of the plow units.

Another object of the invention is the provision, in a two-way plow having latching means for holding the plow in either of its operating positions, of a hydraulic ram attachment connected at one end to apparatus for transmitting motion to move the plow units, and at its other end to the latching apparatus to release the latter incident to operation of the ram to move the plow units.

Other objects and advantages of the invention will become clear from the following detailed description when read in conjunction with the accompanying drawings, wherein:

Figure 1 is a view in side elevation of the rear end of a tractor having mounted thereupon a two-way plow of the rollover type embodying the features of this invention;

Figure 2 is an enlarged plan view of the main part of the plow, showing the latch means and the connection of the hydraulic ram thereto and to the power transmission means by which power is transmitted between a subframe carrying the plow units and a main frame upon which the subframe is mounted;

Figure 3 is a sectional view, enlarged, of the latching mechanism illustrated in Figure 2;

Figure 4 is a section on the line 4—4 of Figure 3; and

Figure 5 is a fragment of a section taken on the line 5—5 of Figure 2 showing particularly the form of the stop 87 and the means by which the plate 25 and the stop 28 may be adjusted.

Referring to the drawings, the implement with which this invention is concerned is a rollover type two-way plow generally designated by the numeral 10 adapted for mounting upon a tractor having a longitudinally extending body 11, a transverse rear axle structure 12, and laterally spaced rear drive wheels 13, only one of which is shown. It may be understood that the tractor is provided with a pair of brackets 14, only one of which is shown, one on each side of the tractor body 11, and this bracket serves for the pivotal connection at its rear end of a forwardly extending drawbar 15 to which is pivotally connected the forward end of a hitch frame 16, forming a part of the implement 10, and comprising laterally spaced members 17 affixed at their rear ends to laterally spaced angle plates 18 having outwardly directed flanges 19 and affixed to the ends of a transversely extending main supporting frame 20. The implement is raised and lowered on the tractor by the provision of a hydraulic ram 21 anchored at one end to the bracket 14 and at its other end pivotally connected to a rearwardly extending arm 22 pivotally connected at its forward end to the bracket 14. A ram 21 and an arm 22 are provided on each side of the tractor body and each arm 22 has depending therefrom a lifting link 23, the lower end of which is connected to the plate 18.

Affixed to and forming a part of the main frame 20 of the plow is a longitudinally extending tubular beam member 24 affixed at its forward end to the transverse frame part 20 and extending rearwardly therefrom.

A pair of transversely extending plates 25 are secured to the rear face of the transverse frame member 20 by bolts 26 and 27, and each of these plates has welded thereto and extending rearwardly therefrom a stop member 28, the purpose of which will hereinafter become clear.

The implement 10 also includes a tool-carrying subframe 29 carrying right and left hand plow units 30 and 31, respectively, consisting of three plow bottoms each. Subframe 29 includes a longitudinally extending frame bar 32 having a short, laterally bent forward portion 33 and a longer transverse portion 34 spaced rearwardly from the part 33 and connected thereto by a bracing bar 35. Transverse portion 34 is bent rearwardly at its end to provide a longitudinally extending part 36 secured to a longitudinally extending frame bar 37. The forward end of bar 37 is bent laterally to provide a transverse portion 38, to which is secured another longitudinally extending bar 39 to which is affixed the forward end of another frame bar 40. Frame bar 37 is connected to frame bar 40 by longitudinally spaced braces 41 and 42, and a diagonal bar 43 connects the rear end of bar 40 to bar 32 through the intermediary of vertically extending triangular supporting plates 44. These plates 44 have secured thereto upright standards 45 upon the ends of which are mounted the right and left hand plow bottoms 46 and 47.

Tool-carrying subframe 29 is rotatably mounted upon the main frame through the intermediary of bearing members 48 and 49 having laterally extending U-shaped arms 50 secured to the bars 35 and 37. At this point it should be clear that by virtue of the mounting of the plow subframe assembly 29 upon the longitudinally extending beam 24 through the intermediary of bearings 48 and 49, the subframe is capable of rotating bodily about the axis of the beam 24 from a position shown in Figure 2 with the plow bottoms 46 in operation to an alternate operating position with the other set of plow bottoms in operation.

The rotation of the subframe 29 carrying the plow units 30 and 31 is limited by the stops 28, in Figure 2 the bar 39 being shown having engaged the horizontal flange 51 of the stop 28, on the left hand side of the implement frame. In Figure 2 the plow unit 30 is shown in operation. In order to reverse the plowing operation and place the unit 31 in operation, the subframe 29 is rotated in a clockwise direction, as viewed from the front of the implement, until the frame bar 39 engages the right hand stop 28. Rotation of the plow-carrying frame 29 is accomplished by power operated mechanism in the form of a hydraulic ram 52, acting through power transmission means 53 to turn the tool frame about the axis of the beam 24.

Interiorly of the beam 24 is a shaft 54, affixed to the beam and projecting from the rear end thereof. Shaft 54 extends through a suitable opening provided in the transverse frame bar portion 34, and has mounted upon its end a bevel gear 55 held in place by a nut 56. Gear 55 meshes with a segment gear 57 mounted on the end of a transverse shaft 58 rockably carried in one or more bearings 59 in the frame bars 36 and 37. The other end of shaft 58 has affixed thereto a rock arm 60 to which is pivotally connected the piston rod 61 of the hydraulic ram 52.

Piston rod 61 is slidably received in the cylinder 62 of the ram, and the latter is pivotally anchored to one arm 63 of a bell crank 64 fulcrumed upon a pivot pin 65 mounted at its ends in the frame bars 37 and 39. Lost motion is provided in the anchorage point of the cylinder 62 upon the implement frame by the rocking of the bell crank 64. Rocking of the bell crank in one direction is limited by the provision of an angled shoulder 66, affixed to an upstanding projection 67 on a transverse brace member 68 secured, as by welding, at its ends to the bars 37 and 39. The shoulder 66 serves as a stop in the operation of the ram unit 52 in extension, the ram 52 being a double acting hydraulic ram supplied with fluid under pressure from the tractor through hose lines 69 and 70. In the retracting stroke of the piston 61 of the ram, bell crank 64 is rocked in a counterclockwise direction, as viewed in Figure 4, until the lower end of arm 71 thereof engages another shoulder 72 affixed, as by welding, to another brace member 73 extending between the frame bars 37 and 39. Thus, the initial stroke of the piston 71 in either direction is utilized to rock the bell crank 64 until one or the other of the stops 66 or 72 is engaged, the resistance of the subframe 29 against turning about the axis of the beam 24 serving to anchor the piston end of the ram 52 until the bell crank 64 has engaged one of these stops.

The purpose of the lost motion in the rocking of bell crank 64 is to effect the operation of a latch mechanism 74 by which the plow-carrying frame 29 is held in either of its alternate operating positions against the stop 28.

The end of arm 71 of bell crank 64 is apertured to receive the bent end of a link 75, the other end of which is also bent for reception in an opening provided in an arm 76 of a T-shaped member 77 pivotally mounted upon a pin 78 carried by the brace member 73. A cross bar 79 engages, at opposite ends, pins 80 and 81 mounted in and projecting, respectively, from slidable latch pins 82 and 83. Latch pins 82 and 83 are preferably square in cross-section, as indicated in Figure 4, and are slidably received in suitable openings provided in the frame bars 37 and 39. In Figure 3, latch pin 82 is shown as retracted within the confines of the openings in the bars 37 and 39, while pin 83 projects therefrom. This has been accomplished by the rocking of the member 77 to retract pin 82 against the action of the spring 84 engaging pin 80 at one end and a plate 85 at the other. Meanwhile a spring 86 surrounding latch pin 83, engages pin 81 to urge it outwardly through the opening in bar 39 and in position for the projecting end thereof to engage a bar 87 affixed to the lower end of a vertical flange 88 of the stop 28. Pin 83 is thus confined between the upper flange 51 of the stop 28, and the lower bar member 87. The latter is preferably bent outwardly at its lower end, as indicated in Figure 5, to facilitate passage of the latch pin toward stop 28 when the plow is alternately moved from one position to another. Adjustment may be made in the disposition of stop 28 by loosening the bolts 26 and adjusting them in an arcuate slot 90 provided in the member 19.

In operation, the ram 52 is shown as having completed part of its stroke to withdraw the latch pin 82 from locking position with reference to bar 87 on the left hand side of the implement frame. As indicated in Figure 2, the bars 87 are so arranged that the left hand bar 87 cooperates with latch pin 82 to lock the subframe against rotation, and the right hand bar 87 cooperates with latch pin 83 when the position of the parts is the reverse of that shown in Figure 2. Therefore, in Figure 2, the ram 52 has been operated in extension with piston rod 61 reacting against the rock arm 60 to cause the cylinder end of the ram to pick up the lost motion provided by bell crank 64 and cause the latter to engage the upper shoulder 66. The ram now reacts against the shoulder 66 to cause the extension of the piston 61 and cylinder 62 to rock the arm 60 and, through gears 57 and 55, to rotate the subframe 29. This is accomplished by virtue of the fact that bevel gear 55 remains stationary and gear segment 57 rides thereon through the rocking of shaft 58. Thus, the entire latching apparatus 74 and the power operated mechanism 52 also rotate with the subframe 29 around the axis of the beam 24 to the alternate position with the alternate set of plow bottoms in operation while the other plow unit is raised to an inoperative position.

The operation of the novel power transmission and plow latching mechanism of this invention will be clearly understood from the foregoing description. It might be noted that while, in extension, ram 52 rocks the bell crank 64 to release latch pin 82 and allow the tool-carrying frame to be reversed so that the left hand set of plow bottoms 31 is moved into operating position while the set of right hand plow bottoms 30 is raised to transport position, latch pin 83 comes into latching position with reference to bar 87 on the right hand side of the plow frame and is only withdrawn when the ram unit is operated in retraction to rock the bell crank 64 in a counter clockwise direction, as viewed in Figure 4, and until the arm 71 of the bell crank engages the shoulder stop 72.

It should also be understood that the invention has been described in its preferred embodiment only and that modifications may be made therein without departing from the spirit of the invention of the scope of the appended claims.

What is claimed is:

1. In a two-way plow having a main supporting frame and a subframe, alternately operable plow units mounted on the subframe, said subframe being movable from one position to another relative to the main frame to alternately place one of said plow units in operating position while the other is placed in an inoperative position, latch means on said main and subframes cooperative in either position of the latter to hold the subframe against movement relative to the main frame, power transmission means connected between said main and subframes for moving the latter relative to the main frame, power operated means operatively connected to said transmission means for actuating the latter, a latch actuator operable in either position of the subframe to release the latter to accommodate movement thereof to another position, and means operatively connecting said power operated means to said latch actuator for releasing the latter incident to operation of said power operated means comprising a rockable member pivoted on the subframe and offering less resistance to operation of the power operated means than that of the power transmission means, said rockable member being rockable in one direction to release the latch means in one position of said subframe and in the other direction to release the latch in the other position of said subframe.

2. The invention set forth in claim 1, wherein the power operated means is a double acting hydraulic ram operable on the extension stroke of the ram piston to move the subframe to one position and on the retraction stroke to move the subframe to the other position and connected at one end to said transmission means and at the other end to said latch actuator.

3. In a two-way plow having a main frame, a subframe mounted on the main frame for rotation about a longitudinal axis and carrying right and left-hand plow units rotatable therewith to alternately place one or the other of said plow units in operating position while the other unit is held in an inoperative position, a pair of latch devices on the subframe, means on the main frame cooperative with the latch means on the subframe in both operating positions of the latter to hold the subframe against rotation, power transmission means acting between said main and subframes to rotate the latter, a hydraulic ram mounted on the subframe and connected at one end to said power transmission means to transmit power thereto, said subframe being rotatable in one direction to place one of said plow units in operating position by operation of the ram in extension and in the other direction by operation of the ram in retraction to place the other plow unit in operating position, a latch actuator pivotally mounted on the subframe connected to the other end of said ram and rockable prior to operation of the transmission means by actuation of the ram, said latch actuator being rockable in one direction by operation of the ram in extension to release one of said latch means and accommodate rotation of the subframe to place one of the plow units in operation and rockable in the other direction by operation of the ram in extension to release the other of said latch means and accommodate rotation of the subframe to place the alternate plow unit in operation, and stop means engageable with said actuator to limit rocking movement thereof in both directions.

References Cited in the file of this patent

UNITED STATES PATENTS

| | | |
|---|---|---|
| 491,126 | Naylor | Feb. 7, 1893 |
| 491,127 | Naylor | Feb. 7, 1893 |
| 2,698,563 | Edwards | Jan. 4, 1955 |